(12) United States Patent
Efimov et al.

(10) Patent No.: US 7,986,744 B2
(45) Date of Patent: Jul. 26, 2011

(54) PRESCRIBED RESPONSE PRECODING FOR CHANNELS WITH INTERSYMBOL INTERFERENCE

(75) Inventors: Andrey Gennadlevich Efimov, St. Petersburg (RU); Felix Aleksandrovich Taubin, St. Petersburg (RU)

(73) Assignee: Intel Corporation, Santa Clara, CA (US)

( * ) Notice: Subject to any disclaimer, the term of this patent is extended or adjusted under 35 U.S.C. 154(b) by 586 days.

(21) Appl. No.: 11/794,593

(22) PCT Filed: Dec. 30, 2004

(86) PCT No.: PCT/RU2004/000538
§ 371 (c)(1),
(2), (4) Date: Oct. 17, 2008

(87) PCT Pub. No.: WO2006/073326
PCT Pub. Date: Jul. 13, 2006

(65) Prior Publication Data
US 2009/0274239 A1    Nov. 5, 2009

(51) Int. Cl.
*H04B 15/00* (2006.01)

(52) U.S. Cl. ........ 375/285; 375/233; 375/261; 375/296; 375/350

(58) Field of Classification Search ................... 375/222, 375/285, 296
See application file for complete search history.

(56) References Cited

U.S. PATENT DOCUMENTS

| 6,243,425 | B1 | 6/2001 | Langberg et al. |
| 6,324,220 | B1* | 11/2001 | Sellars ................... 375/296 |
| 6,732,315 | B2* | 5/2004 | Yagil et al. ............... 714/755 |
| 7,242,724 | B2 | 7/2007 | Alexiou et al. |
| 7,257,181 | B2* | 8/2007 | Jones et al. ............... 375/350 |
| 7,486,739 | B2* | 2/2009 | Hottinen et al. ........... 375/267 |
| 7,512,191 | B2* | 3/2009 | Laamanen et al. .......... 375/296 |
| 7,616,701 | B2* | 11/2009 | Ungerboeck .............. 375/295 |
| 2003/0185310 | A1 | 10/2003 | Ketchum et al. |
| 2004/0028155 | A1* | 2/2004 | Dornstetter et al. ........ 375/343 |
| 2004/0233981 | A1 | 11/2004 | Porter et al. |
| 2010/0150264 | A1 | 6/2010 | Taubin et al. |
| 2010/0226422 | A1 | 9/2010 | Taubin et al. |

FOREIGN PATENT DOCUMENTS

| WO | WO-9837671 A1 | 8/1998 |
| WO | WO-2007001205 A1 | 1/2007 |
| WO | WO-2007037715 A1 | 4/2007 |

OTHER PUBLICATIONS

Li, Y. , et al., "Optimum soft-output detection for channels with intersymbol interference", *IEEE Transactions on Information Theory*, 41(3), (May 1995), 704-713.

(Continued)

*Primary Examiner* — Shuwang Liu
*Assistant Examiner* — Dhaval Patel
(74) *Attorney, Agent, or Firm* — Schwegman, Lundberg & Woessner, P.A.

(57) ABSTRACT

Methods and apparatus are provided for prescribed response precoding schemes for signal transmission in channels with intersymbol interference. An embodiment includes generating a prescribed feedback filter polynomial as the quotient of a feedback filter polynomial and a target polynomial to form a feedback filter in a precoder, where the target polynomial is a divisor of the feedback filter polynomial.

35 Claims, 6 Drawing Sheets

OTHER PUBLICATIONS

Brown, C., et al., "Effects of Training Sequence Length and Precoder Update Duration over a Fading Channel in the MMDS Band", *Personal, Indoor and Mobile Radio Communications*, 1, (Sep. 18, 2000),595-598.

Forney, G. D., "Maximum-Likelihood Sequence Estimation of Digital Sequences in the Presence of Intersymbol Interference", *IEEE Transactions on Information Theory, IEEE Service Center*, vol. IT-18, No. 3, (May 1, 1972),363-378.

Harashima, H , et al., "Matched-Transmission Technique for Channels With Intersymbol Interference", *IEEE Transactions on Communications*, 20(4), (Aug. 1972),774-780.

Mertins, A., "Design of Filterbank Transceivers for Dispersive Channels with Arbitrary-Length Impulse Response", *Journal of telecommunications and Information technology.*, (Feb. 2003),11-16.

Mertins, A. , "Design of Redundant FIR Precoders for Arbitrary Channel Lengths Based on an MMSE Criterion", *ICC 2002, International conf. on communications*, 1 of 5, (Apr. 28, 2002),212-216.

Mertins, A. , "MMSE Design of Redundant FIR Precoders Arbitrary Channel Lengths", 51(9), (Sep. 2003),2402-2405.

Proakis, John G., "Digital communications", New York : *McGraw-Hill*, 3rd ed.,(1995), 583-635.

Proakis, John G., "Digital communications", New York : *McGraw-Hill*, 4th ed.,(2000), 598-658.

Al-Dhahir, N , "Stable pole-zero modeling of long FIR filters with application to the MMSE-DFE", *IEEE Transactions on Communications*, 45(5), (May 1997),508-513.

Burrus, C , "Time domain design of recursive digital filters", *IEEE Transactions on Audio and Electroacoustics*, 18(2), (Jun. 1970),137-141.

Evans, A , "Optimal least squares time-domain synthesis of recursive digital filters", *IEEE Transactions on Audio and Electroacoustics*, 21(1), (Feb. 1973),61-65.

Li, Funxin , et al., "Optimum soft-output detection for channels with intersymbol interference", *IEEE Transactions on Information Theory*, 41(3), (May 1995),704-713.

Shaw, A , "An optimal method for identification of pole-zero transfer functions", *IEEE International Symposium on Circuits and Systems, ISCAS '92. Proceedings*, vol. 5, (May 3-6, 1992),2409-2412.

Tu, Jerome C., "Theory, design and application of multichannel modulation for digital communications", *PhD Thesis—Stanford University*, (1991),1-234.

Ungerboeck, Gottfried , "10GBASE-T Modulation & Coding, Set of Fixed Precoders, and Start-up", *IEEE P802.3an Task Force Meeting*, (Nov. 2004),1-29.

Ungerboeck, Gottfried , "10GBASE-T PAM Scheme: Fixed Precoder for all Cable Types and Lengths", *IEEE P802.3an Task Force Meeting*, (Jul. 2004),1-27.

* cited by examiner

PRESCRIBED RESPONSE PRECODING FOR CHANNELS WITH INTERSYMBOL INTERFERENCE

This application is a U.S. National Stage Filing under 35 U.S.C. 371 from International Patent Application Serial No. PCT/RU2004/000538, filed Dec. 30, 2004, and published on Jul. 13, 2006 as WO 2006/073326 A1, which is incorporated herein by reference.

TECHNICAL FIELD

Embodiments of the invention relate generally to error correcting of communication signals.

BACKGROUND

Channels in a communication network may typically experience channel distortion. This channel distortion may result in intersymbol interference (ISI), which essentially is the spreading of a signal pulse outside its allocated time interval causing interference with adjacent pulses. If a communication channel is uncompensated with respect to its intersymbol interference, high error rates may result. Various methods and designs are used for compensating or reducing intersymbol interference in a signal received from a communication channel. The compensators for such intersymbol interference are known as equalizers. Various equalization methods include maximum-likelihood (ML) sequence detection, linear filters with adjustable coefficients, and decision-feedback equalization (DFE).

Linear and DFE equalizers at the receiver end of a communication system are generally accompanied with increased noise characteristics. The increased noise characteristics may be reduced with an equalizer placed at the transmitter end. Such a design relies on the channel response being a known factor to the transmitter. Since channel characteristics may vary with time, design of the complete equalizer at the transmitter end is not straight forward. However, the channel characteristics do not vary significantly over time in wire line channels. This lack of time variation allows for a DFE feedback filter to be placed at the transmitter and a DFE feedforward filter at the receiver. However, using such a DFE design may result in the signal points at the transmitter, after subtracting intersymbol interference, having a larger dynamic range than the original set of signals, thus requiring larger transmitter power. The problems associated with increased required power can be addressed with precoding information symbols prior to transmission. One precoding technique is the Tomlinson-Harahsima precoding scheme.

Figure 1:
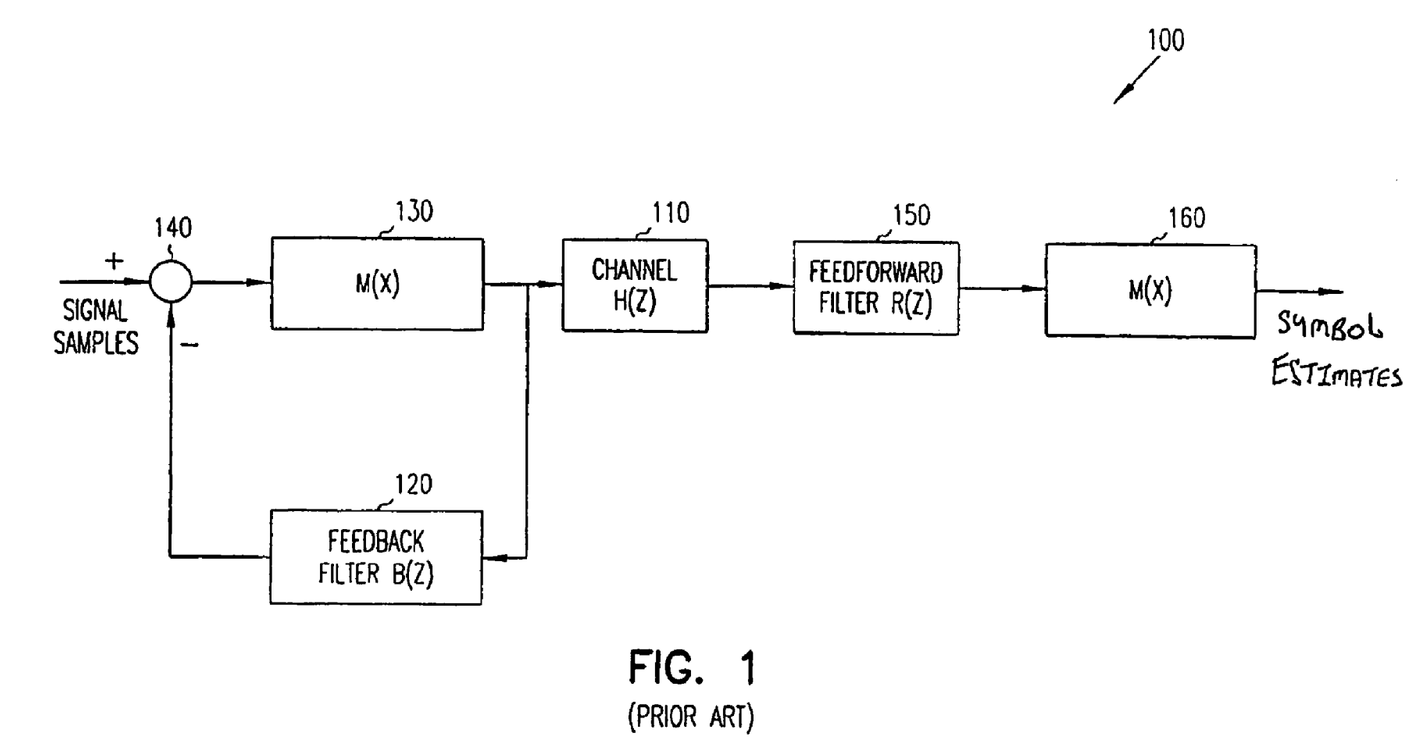
FIG. 1 shows a classical Tomlinson-Harashima precoding arrangement for a communication channel.

FIG. 1 shows a classical Tomlinson-Harashima precoding (THP) arrangement 100 for a communication channel 110. Classical Tomlinson-Harashima precoding provides for implementation of a feedback filter at the transmitter end of the communication channel with a mechanism to limit output signal amplitude. Signal samples to be transmitted in channel 110 are subjected to a feedback filter 120 defined by a polynomial B(Z) and a modulo reduction function 130, M(x), to avoid overflowing the signal bounds. Modulo reduction function 130 is a modulo operation to limit the amplitude of the signals to be transmitted into channel 110. The feedback loop is closed with feedback filter 120 coupled back to a summer 140 that receives the signal samples. At the receive end of the communication channel, a feedforward filter 150 defined by polynomial R(z) receives the transmitted symbols and provides a filtered signal to a receive modulo reduction function 160 that maps the signal to symbol estimates in an operation effectively inverse to map reduction function 130. The classical Tomlinson-Harashima precoding arrangement provides for essentially complete cancellation of intersymbol interference on systems, where the channel impulse response is stable, which is an assumption used to design the appropriate Tomlinson-Harashima precoding for the system.

Figure 2A:
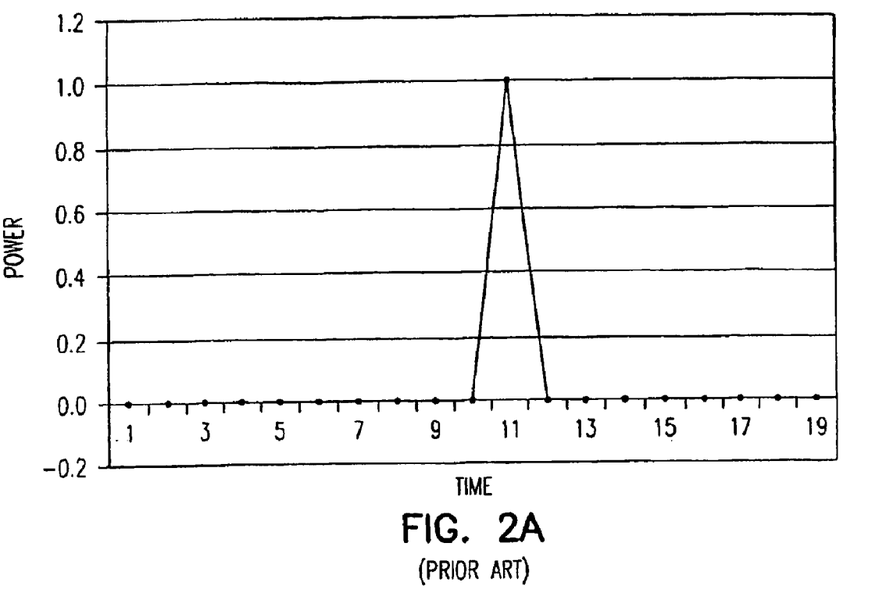
FIGS. 2A-2B show a system channel response for a δ-impulse at a transmitter in the classical Tomlinson-Harashima of FIG. 1.
Figure 2B:
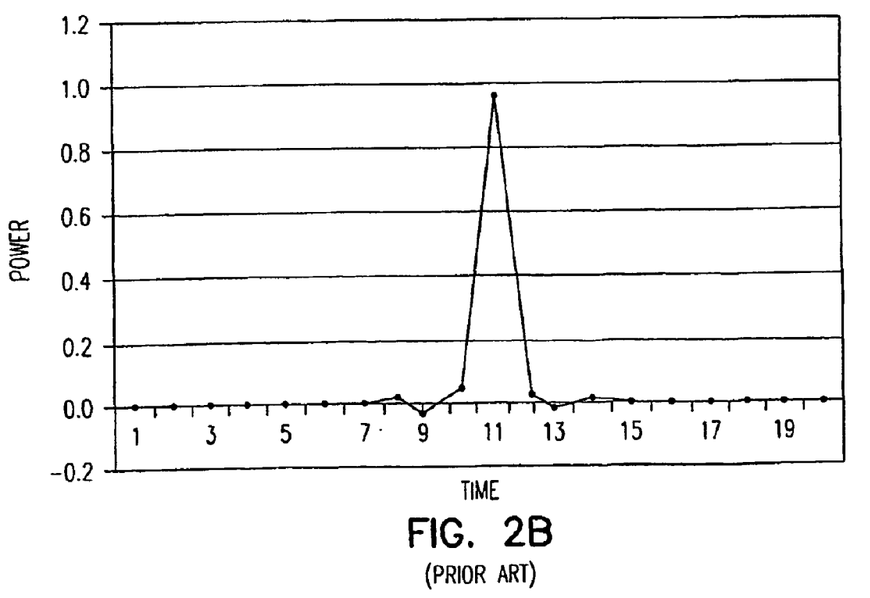

FIGS. 2A-2B show a system response for an δ-impulse at a transmitter in the classical Tomlinson-Harashima of FIG. 1. FIG. 2A shows show the power vs. time relation for δ-impulse at a transmitter. The resulting system response is shown in FIG. 2B, which indicates almost complete avoidance of ISI. However, to provide higher speed reliable data communication what is needed are enhanced schemes for providing channel equalization, which at the same time can be implemented without a significant amount of complexity.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the present invention. Other embodiments may be utilized and structural, logical, and electrical changes may be made without departing from the scope of the invention. The various embodiments disclosed herein are not necessarily mutually exclusive, as some disclosed embodiments can be combined with one or more other disclosed embodiments to form new embodiments. The following detailed description is, therefore, not to be taken in a limiting sense, and the scope of the embodiments of the present invention is defined only by the appended claims, along with the full scope of equivalents to which such claims are entitled.

In an embodiment, increased gain is provided at a receiving end of a communication channel by modifying a precoder filter designed to completely reduce intersymbol interference such that a signal passing through the modified precoder filter experiences a quantity of ISI in transmission to the receiving end. By appropriately selecting the modification to the precoder filter, the amount of ISI is controlled.

Figure 3:
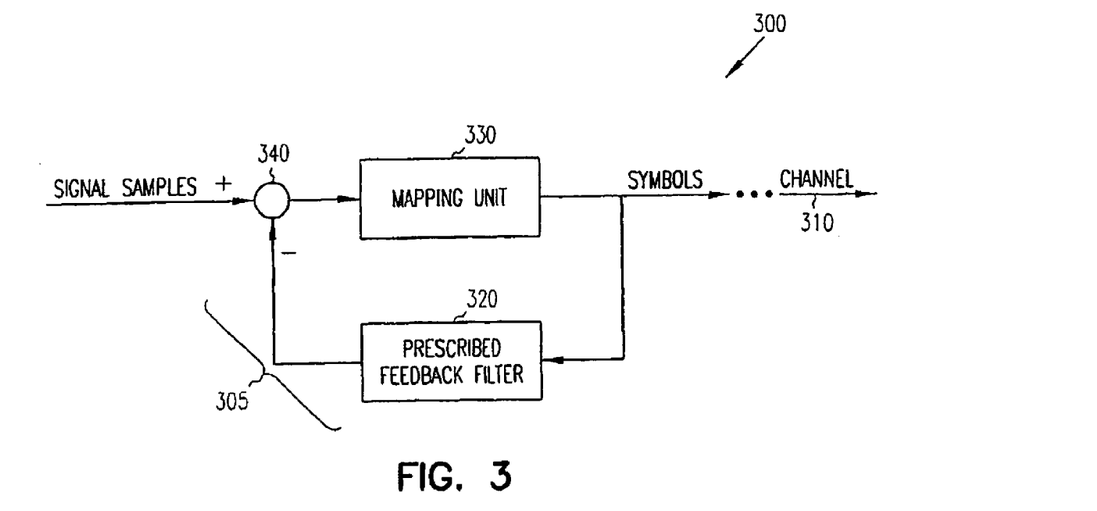
FIG. 3 illustrates a block diagram of an embodiment of an apparatus having a precoder including a mapping unit and a prescribed feedback filter, where the prescribed feedback filter provides a modified filter to enhance system channel response.

FIG. 3 illustrates a block diagram of an embodiment of an apparatus 300 having a precoder 305 including a mapping unit 330 and a prescribed feedback filter 320, where prescribed feedback filter 320 provides a modified filter to enhance system channel response. Precoder 305 couples to a channel 310 and provides precoding of signal samples for transmission in channel 310. Prescribed feedback filter 320 is coupled to mapping unit 330 through summer 340. Apparatus 300 includes various elements in addition to precoder 305 for transmission of signal samples on communication channel 310, where a portion of these elements may be considered as coupling precoder 305 to channel 310. Such communication elements are known to those skilled in the art and are not known shown in an effort to focus on apparatus that include embodiments for a prescribed feedback filter to enhance overall system channel response associated with information transmission in a communication channel.

A mapping unit maps a set of signal samples to a set of symbols according to set of rules that may place a bound on the amplitude to the symbol to be transmitted in channel 310. Mapping unit 330 may be realized as a unit that performs a modulo operation. A modulo operation on an entity with respect to some basis unit returns a remainder from the division operation of the entity by the basis unit. In an embodiment, a prescribed feedback filter may be realized as a modification of a standard precoding feedback filter, where the standard precoding feedback filter is designed for a precoder that is used to effectively provide complete compensation of ISI for a communication channel. Prescribed feedback filter 320 may modify a standard precoding feedback filter such that instead of complete equalization, channel interference is allowed. Such embodiments allow the implementation of a maximum a posteriori probability (MAP) detection scheme in the receiver after equalization to increase the system gain with respect to the channel transmission.

Figure 4:
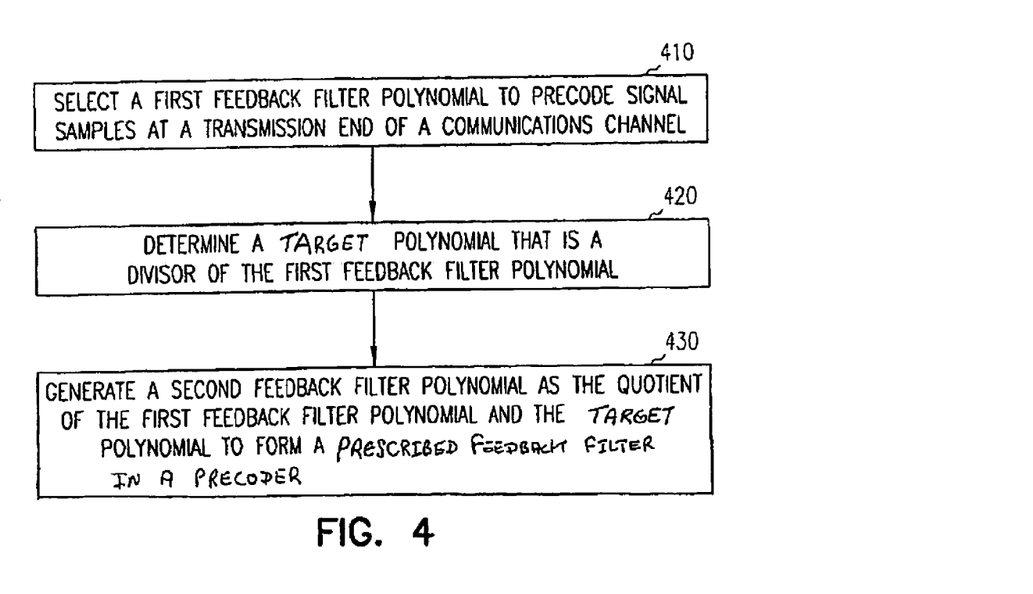
FIG. 4 illustrates an embodiment of a method for providing prescribed response preceding to enhance system channel response.

FIG. 4 illustrates an embodiment of a method for providing modified precoding to enhance system response. At 410, a feedback filter polynomial to precode signal samples at a transmission end of a communication channel is selected. The feedback filter polynomial may be selected as a polynomial associated with a precoder in an arrangement to completely compensate for ISI in the communication channel. At 420, a target polynomial that is a divisor of the selected feedback filter polynomial is determined. In an embodiment, a divisor polynomial having the lowest non-zero degree is selected. At 430, a second feedback polynomial is generated as the quotient of the selected feedback filter polynomial divided by the target polynomial. The second feedback polynomial may be used to form a prescribed feedback filter in a precoder. The second feedback polynomial may be generated to control intersymbol interference. Control of intersymbol interference may include allowing some interference into the communication channel to allow an increase of system gain associated with the transmitting end, the communication channel, and the receiving end.

In an embodiment, a precoding scheme includes generating a prescribed response precoding scheme from a Tomlinson-Harashima arrangement. The feedback filter for a Tomlinson-Harashima arrangement may be determined for a given communication channel. The feedback filter may be determined as a feedback filter polynomial denoted as $$B(z)=1+b_1 z^{-1}+b_2 z^{-2}+\ldots+b_n z^{-n},$$

where $b_i$ are filter coefficients and n is the filter length. The polynomial B(z) may be determined using techniques to eliminate ISI in the given communication channel that are known to those skilled in the art. As an example, consider a process for coefficient optimization of decision-feedback equalizer (DFE) having a feedback filter and a feedforward filter, each with taps spaced at the symbol interval. Input to the feedforward section may be represented by a received signal sequence $\{v_k\}$. Further, the feedback filter is functionally implemented to remove that part of the ISI from a present estimate caused by previously detected symbols. The equalizer, having (K1+1) taps in the feedforward filter and K2 taps in the feedback filter, may have an output that can be represented as $$I^+_k = \Sigma^0_{j=-K1}(c_j v_{k-j}) + \Sigma^{K2}_{j=1}(c_j I^-_{k-j})$$

where $I^+_k$ is an estimate of the k th information symbol, $\{c_j\}$ are tap coefficients for the filters, and $\{I^-_{k-1}, \ldots, I^-_{k-K2}\}$ are previously detected symbols. With previously detected symbols in the feedback filter taken as correct, the minimization of the mean square value of the error (MSE) leads to a set of equations for the coefficients of the feedforward filter:

$$\Sigma^0_{j=-K1} \psi_{lj} c_j = f^*_{-l}, l=-K1, \ldots, -1, 0$$

where, $\psi_{lj} = \Sigma^{-1}_{m=0} f^*_m f_{m+1-j} + N_0 \delta_{lj}$, $l$, $j=-K1, \ldots, -1$. 0, and $N_0$ is a noise spectral density factor. The coefficients of the feedback filter can be derived from the coefficients of the feedforward section as $$c_k = -\Sigma^0_{j=-K1}(c_j f_{k-j}), k=1, 2, \ldots, K2.$$

This coefficient determination is known to those skilled in the Art. See, for example J. Proakis, *Digital Communications*, pages 621-622, McGraw Hill, 1995. These coefficients may be used as the coefficients $b_i$ of B(z). Under the assumption that K2≧L, where L is the number of symbols affected by intersymbol interference, intersymbol interference may be eliminated. In a Tomlinson-Harashima precoding arrangement, the feedback filter is at the transmitting end and the feedforward filter is at the receiving end.

Figure 5:
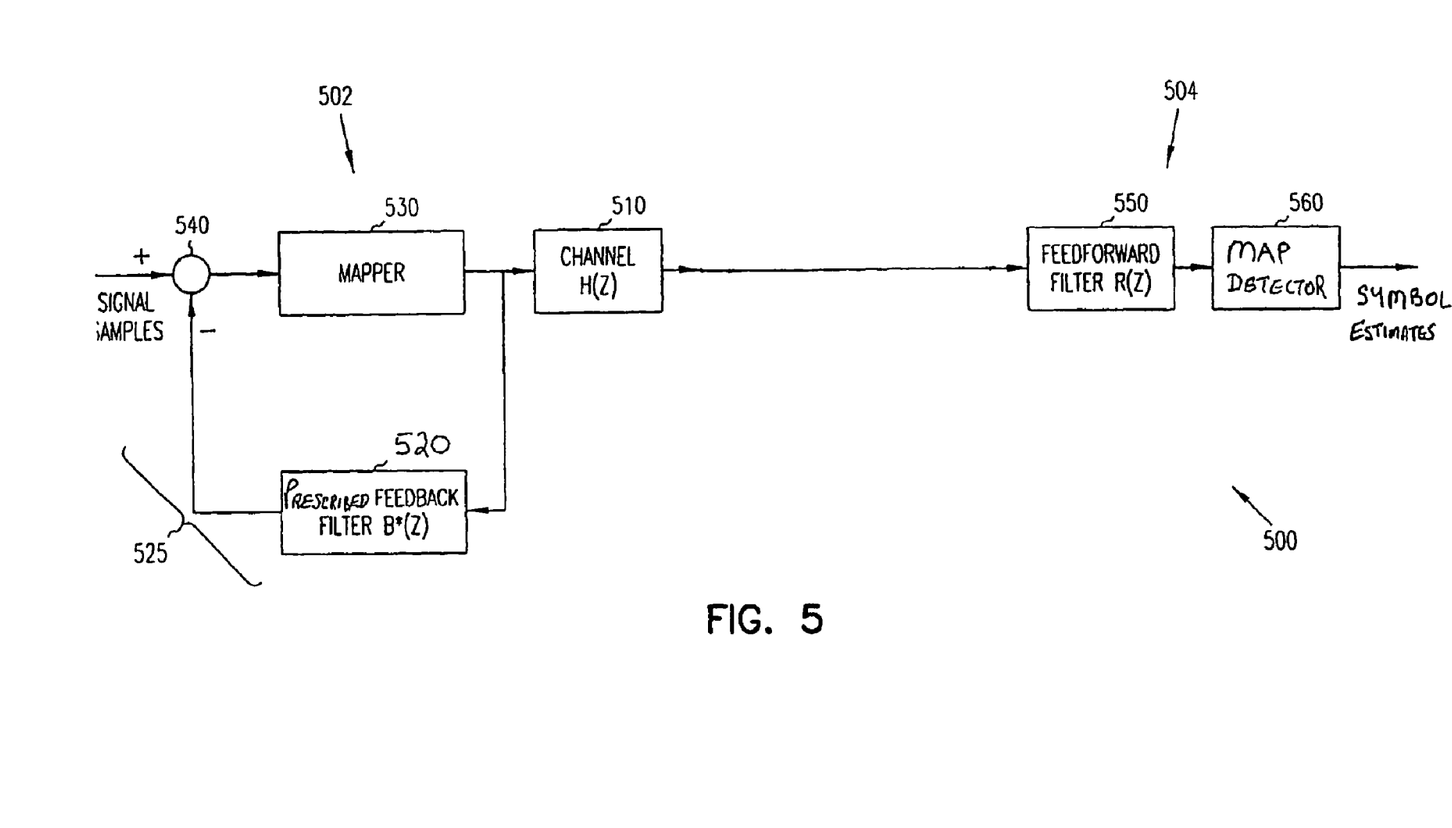
FIG. 5 illustrates a block diagram of an embodiment of a communication network having an embodiment of a precoder at a transmitting node to enhance the system channel response at a receiving node coupled over a channel to the transmitting node.

In an embodiment, a modified feedback filter polynomial, such as a polynomial for prescribed feedback filter 320 of FIG. 3, can be computed as:

$$B^*(z)=B(z)/F(z),$$

where B(z) denotes a standard feedback filter polynomial and F(z) is a target polynomial of a small power such that F(z) is the divisor of feedback polynomial B(z). Since F(z) is a divisor of feedback filter polynomial B(z), all the roots (z, where F(z)=0) of F(z) are also roots of feedback filter polynomial B(z). To prevent instability in a feedback filter, all roots of this filter should be inside the unit circle, in other words, the absolute value of the roots, $r_b$ should be less then 1, abs($r_i$)<1. There are many possible choices of the roots for F(z) polynomial construction, but some combinations of roots may provide better performance than others. Namely, the roots of polynomial F(z) should be selected in such a way as to maximize the effective signal-to-noise ratio (SNR) at the output of a feedforward filter in a receiver, such as feedforward filter 550 in FIG. 5. The effective SNR substantially determines the performance transmission over channels with intersymbol interference. See, G. D. Forney Jr., "Maximum-likelihood sequence estimation of digital sequences in the presence of intersymbol interference," *IEEE Trans. Info. Theory*, vol. IT-18, pp. 363-378, May 1972. Such a feedforward filter need not be modified in various embodiments for prescribed response precoding scheme. One approach to select the best results may be to perform a thorough search through the all roots of feedback polynomial B(z).

The coefficients of standard feedback polynomial B(z) may be determined in a number of conventional manners. For a wire line network in which the transmit end, the receiving end, and the transmission medium are essentially invariant, the channel characteristics for the coefficients may be known. Alternatively, the coefficients may be calculated using relationships that define the network components. The channel characteristics may be determined in a training mode arrangement with the transmission of a training signal from a transmitting end to a receiving end that allows for determination of the channel response. The receiving end would transmit back to the transmitting end information regarding the channel response.

The formation of the prescribed feedback filter polynomial, B*(z), allows for the implementation of a feedback filter of lower power than the standard feedback polynomial B(z). This scheme provides for the presence of short interference up to the equalization at a receiving end. This small amount of interference provides increased gain at the receiving end. This allows for the use of MAP detection with acceptable complexity after the equalization at the receiving end. Further, the length of the channel response may be defined by the target polynomial F(z). In an embodiment, the length of the prescribed feedback polynomial, B*(z), may be equal to 100 or more. In addition to increasing the signal energy at the input of an equalizer at a receiving end and allowing the use of a MAP-detector after a precoder for better equalization, the implementation of prescribed response precoding scheme provides for selectable target length of the energy and shape of the overall impulse response at the receiving end. Such a prescribed response precoding scheme may be implemented in 10 Gigabit Ethernet schemes or in other communication oriented applications.

FIG. 5 illustrates a block diagram of an embodiment of a communication network 500 having an embodiment of a precoder 525 at a transmitting node 502 to enhance the system channel response at a receiving node 504 coupled over a channel 510. Network nodes 502, 504 may include various communication apparatus that may interact with precoder 525 at network node 502 and with a feedforward filter 550 coupled with a MAP detector 560 at network node 504. Such additional communication apparatus are not shown in order to focus on embodiments of a precoder for a communication channel in communication network 500.

At network node 502, precoder includes a mapper 530 having an output coupled to a prescribed feedback filter 520. Mapper 530 may be realized as a modulo operation unit. Prescribed feedback filter 520 may be realized using various embodiments including an embodiment associated with FIG. 4. Prescribed feedback filter 520 is coupled back to the input of mapper 530 through a summer 540 that receives signal samples for precoding prior to transmission in a processed format.

At network node 504, a signal is received from channel 510 and provided to feedforward filter 550. The received signal may be processed through a whitening filter for noise whitening and a matched filter for maximization of the SNR at output of feedforward filter 550. MAP detector 560 provides the mapping of the received signal to symbol estimates corresponding to the signal samples input to precoder 525 at network node 502. Mapping of the signal to symbol estimates may be provided in MAP detector 560. The symbol estimates may be provided to an integrator scheme.

Network nodes 502 and 504 may each include a precoder and associated feedforward filter and Map detector to provide bidirectional communication and may also include an associated matched filter and whitening filter. Network nodes 502 and 504 may each include a number of systems that may effectively be coupled to precoder 525 and to MAP detector 560, respectively, to communicate over channel 510. Systems at these nodes may provide one or more functions at a node. A nodal system may direct operations of other systems and/or apparatus at the node. Systems at each network node 502, 504 may include external connections to each other that are wired or wireless. In an embodiment, nodal systems may be realized as a switch, a router, a computer, a server, or combination of these elements. Further, nodal systems may couple to each other or other apparatus at a node over a medium that is compatible with Peripheral Component Interconnect (PCI) or with PCI express.

The network nodes 502, 504 each may represent processing systems having a physical layer (PHY) entity arranged to operate in accordance with 10 GBase-T as defined by the IEEE 802.3an series of standards, for example. The 10 GBase-T PHY may interface with, for example, a 10 G media access control (MAC) and Gigabit Media Independent Interface (XGMII) in the IEEE architecture. The 10 GBase-T PHY may include part of a network interface card (NIC), for example. Nodes 502, 504 may include any processing system and/or communications device suitable for use with a 10 GBase-T device. For example, nodes 502, 504 may be implemented as a pair of switches, a pair of routers, a pair of servers, a switch and a router, a switch and a server, a server and a router, and so forth. In addition, nodes 502, 504 also may be part of a modular system in which 10 GBase-T is the high-speed connection for the system. Further examples for nodes 502, 504 may include high-end servers, supercomputers, clusters, grid computing, workgroup switch uplinks, aggregation uplinks, storage systems, and so forth. The embodiments are not limited in this context.

Various embodiments or combination of embodiments for apparatus and methods for a prescribed response preceding scheme can be realized in hardware implementations, software implementations, and combinations of hardware and software implementations. These implementations may include a computer-readable medium having computer-executable instructions for performing an embodiment of a prescribed response precoding scheme. In an embodiment, a computer-readable medium stores instructions which, when performed by a machine, cause the machine to select a first feedback filter polynomial to precode signal samples at a transmission end of a communication channel, determine a target polynomial that is a divisor of the first feedback filter polynomial, and generate a second feedback filter polynomial as the quotient of the first feedback filter polynomial and the target polynomial to form a prescribed feedback filter in a precoder. The instructions may include directing the machine to determine the coefficients of the first feedback filter polynomial from known characteristics of the transmitter, receiver, and transmission medium. Alternatively, the instructions may cause the machine enter a training mode between a transmitter and a receiver to determine the channel response characteristics associated with the transmitter, receiver, and transmission medium, which may then be taken to be invariant, at least over a selectable period of time. The computer-readable medium is not limited to any one type of medium. The computer-readable medium used will depend on the application using an embodiment.

Figure 6A:
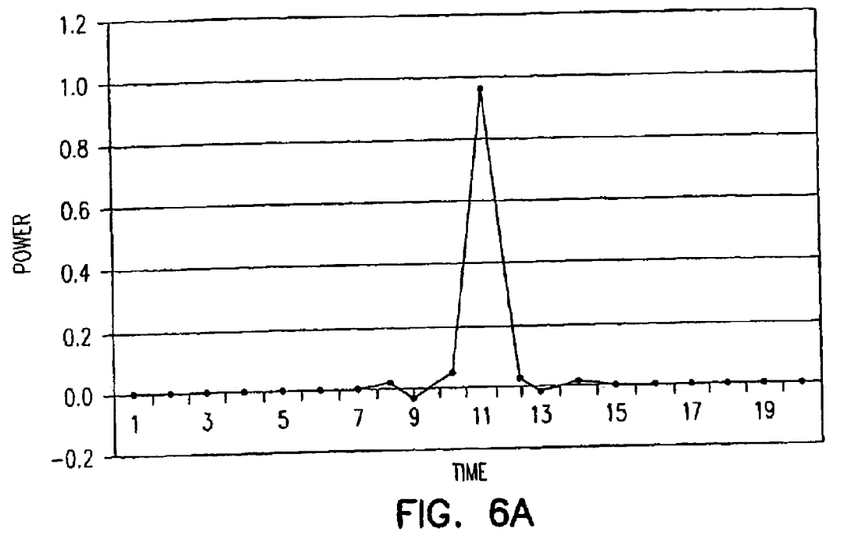
FIGS. 6A-6B represents an impulse response at the receiving node for the usual THP preceding and an impulse response at the receiving node in the embodiment of FIG. 5.
Figure 6B:
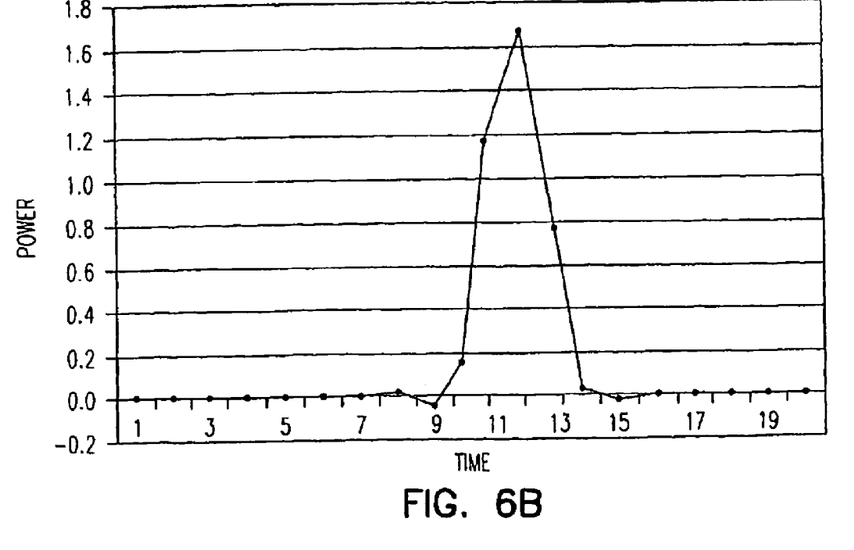

FIG. 6A represents an impulse response at the receiving node for the usual THP preceding. FIG. 6B represents an impulse response at the receiving node in the embodiment of FIG. 5. System impulse response in FIG. 6B has three significant samples at times 11, 12, and 13 that may be further used in MAP detection procedures for providing more reliable decisions. It can be seen that the target impulse energy associated with a precoding scheme such as shown in FIG. 5 is a few times greater then the energy that can be achieved in classic precoder scheme of FIG. 1. More precisely this response allows attainment of an increase of effective SNR by 3.76 dB compared with the usual THP scheme. This comparison indicates that embodiments for a prescribed response precoding scheme may outperform the classic Tomlinson-Harashima preceding scheme.

Figure 7:
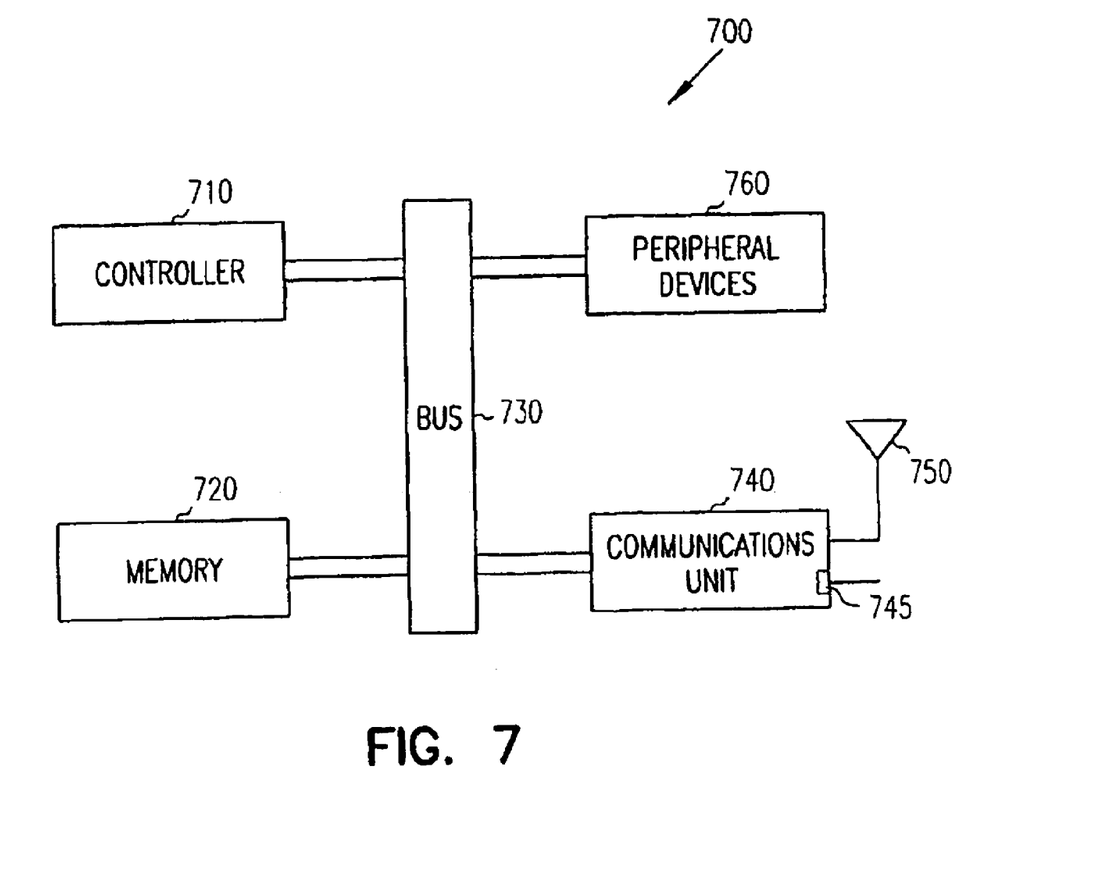
FIG. 7 illustrates a block diagram of an embodiment of a system having a precoder including a mapping unit and a prescribed feedback filter, where the prescribed filter is a modified filter to enhance the system response.

FIG. 7 illustrates a block diagram of an embodiment of a system 700 having an embodiment of a prescribed response preceding scheme to enhance the system communication channel response. System 700 includes a controller 710, a memory 720, and a bus 730, where bus 730 provides electrical connectivity between controller 710 and memory 720 and between controller 710 and a communication unit 740.

Communication unit 740 may include an embodiment of a prescribed response precoding scheme similar to the precoding schemes discussed with respect to FIGS. 3-5. Communication unit 740 may couple to a wired network or a wireless network. Alternatively, communication unit 740 may include a network interface to couple to a wired network and to a wireless network. A wired network may include a network having wire channels, fiber optic channels, and/or co-axial channels.

An embodiment may include an additional peripheral device or devices 760 coupled to bus 730. Bus 730 may be compatible with PCI or with PCI express. In an embodiment, communication unit 740 may include a network interface card. In an embodiment, communication unit 740 may include a communications device suitable for use with a 10 GBase-T device. Communication unit 740 may include a connection 745 to a wired network. In a wireless embodiment, communication unit 740 may be coupled to an antenna 750. In an embodiment, antenna 750 may be a substantially omnidirectional antenna. System 700 may include, but is not limited to, information handling devices, wireless systems, telecommunication systems, fiber optic systems, electro-optic systems, and computers.

In an embodiment, controller 710 is a processor. Memory 720 may include any form of computer-readable medium that has computer executable instructions to provide a prescribed feedback filter in accordance with various embodiments for a prescribed response precoding scheme to enhance the system communication channel response. Peripheral devices 760 may also include displays, additional storage memory, or other control devices that may operate in conjunction with controller 710. Alternatively, peripheral devices 760 may include displays, additional storage memory, or other control devices that may operate in conjunction with controller 710, communication unit 740, and/or memory 720.

In a wireless application, the channel characteristics may be continually updated at a transmitting section of communication unit 740 in system 700 so that a standard feedback polynomial B(z) may be determined. Once B(z) is known, the prescribed feedback polynomial, B*(z), may be determined and a prescribed feedback filter realized. These channel characteristics may be provided as status information from a receiver at the receiving end of the wireless channel over information feedback channels. Use of these information feedback channels provides for an adaptive prescribed response precoding scheme. Further, in a wireless arrangement in which the transmission medium is relatively steady or slowly varying, the channel characteristics may be determined in a manner similar to a wire line network.

Embodiments for prescribed response precoding scheme may be adapted to be used in a system operating with a communication channel. Such embodiments may be used with an Ethernet channel including a wireless Ethernet channel. The communication channel may be part of a land based communication network or a wireless communication network. Indeed, embodiments may well be implemented as part of a wireless system using multi-carrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and similar communication systems.

Various embodiments for a prescribed response precoding scheme may provide approaches to communication channel design that provides an extended channel, which includes a precoder at the transmitter and a feedforward filter at the receiver, with prescribed response that has a controlled intersymbol interference. The prescribed response precoding scheme provides for selecting an amount of ISI for the extended channel. This may provide an increased signal-to-noise ratio due to a constructed impulse response with increased energy at the receiving end and allow for the ability to use a MAP-detector after a precoder for better equalization.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon reviewing the above description. The scope of the present invention includes any other applications in which embodiment of the above structures and fabrication methods are used. The scope of the embodiments of the present invention should be determined with reference to the appended claims, along with the full scope of equivalents to which such claims are entitled.

What is claimed is:

1. A method comprising:
   selecting a first feedback filter polynomial for a precoder to precode signal samples at a transmission end of a communication channel, the first feedback filter polynomial selected with respect to completely compensating for intersymbol inference in transmission in the communication channel, the first feedback filter polynomial being a polynomial of a non-zero degree; and
   forming a prescribed feedback filter, in the precoder, by generating a second feedback filter polynomial as a quotient of the first feedback filter polynomial and a target polynomial, the prescribed feedback filter formed to provide a controlled quantity of intersymbol inference in transmission in the communication channel, the target polynomial being a polynomial of a non-zero degree, the target polynomial being a divisor of the first feedback filter polynomial, the degree of the target polynomial being different from the degree of the first feedback filter polynomial.

2. The method of claim 1, wherein generating the second feedback filter polynomial includes generating the second feedback filter polynomial having all of its roots inside a unit circle.

3. The method of claim 1, wherein generating the second feedback filter includes selecting the second feedback polynomial to form a feedback filter that allows an amount of interference into the communication channel to increase a system gain with respect to the communication channel and a receiving end of the communication channel.

4. The method of claim 1, wherein determining the target polynomial includes selecting the target polynomial to substantially maximize a signal-to-noise ratio at an output of a feed-forward filter at a receiver adapted to receive a signal processed at the transmission end using the prescribed feedback filter.

5. The method of claim 1, wherein the method includes selecting roots of the target polynomial to substantially maximize a signal-to-noise ratio at an output of a feed-forward filter at a receiver adapted to receive a signal processed at the transmission end using the prescribed feedback filter.

6. The method of claim 5, wherein selecting the roots of the target polynomial includes searching for all the roots of the first feedback filter polynomial.

7. The method of claim 1, wherein generating the second feedback filter polynomial to form the prescribed feedback filter includes forming the prescribed feedback filter to control intersymbol interference such that the target polynomial having a lowest non-zero degree is selected.

8. The method of claim 1, wherein selecting the first feedback filter polynomial for precoding includes selecting the first feedback filter polynomial for Tomlinson-Harashima precoding.

9. a non-transitory computer-readable storage medium having instructions thereon, which instructions when performed by a machine, cause the machine to:
select a first feedback filter polynomial for a precoder to precode signal samples at a transmission end of a communication channel, the first feedback filter polynomial selected with respect to completely compensating for intersymbol inference in transmission in the communication channel, the first feedback filter polynomial being a polynomial of a non-zero degree; and
form a prescribed feedback filter, in the precoder, by generating a second feedback filter polynomial as a quotient of the first feedback filter polynomial and a target polynomial, the prescribed feedback filter formed to provide a controlled quantity of intersymbol inference in transmission in the communication channel, the target polynomial being a polynomial of a non-zero degree, the target polynomial being a divisor of the first feedback filter polynomial, the degree of the target polynomial being different from the degree of the first feedback filter polynomial.

10. The non-transitory computer-readable storage medium of claim 9, wherein
generating the second feedback filter polynomial includes generating the second feedback filter polynomial having all of its roots inside a unit circle.

11. The non-transitory computer-readable storage medium of claim 10, wherein the instructions, which when performed by a machine, further cause the machine to select a root of the target polynomial to substantially maximize a signal-to-noise ratio at an output of a feed-forward filter at a receiver adapted to receive a signal processed using the prescribed feedback filter.

12. The non-transitory computer-readable storage medium of claim 11, wherein to select a root of the target polynomial includes searching for all the roots of the first feedback filter polynomial.

13. The non-transitory computer-readable storage medium of claim 10, wherein to form the prescribed feedback filter includes forming the prescribed feedback filter to control intersymbol interference such that the target polynomial having a lowest non-zero degree is selected.

14. The non-transitory computer-readable storage medium of claim 10, wherein to select the first feedback filter polynomial for precoding includes selecting the first feedback filter polynomial for Tomlinson-Harashima precoding.

15. An apparatus comprising:
a mapping unit; and
a feedback filter coupled to the mapping unit, the mapping unit and the feedback filter adapted as a precoder to provide a signal to a communication channel, the feedback filter structured to provide a controlled quantity of intersymbol inference in transmission in the communication channel, wherein the feedback filter has filter coefficients selected from a quotient of a first feedback filter polynomial modified by a target polynomial, the first feedback filter polynomial selected with respect to completely compensating for intersymbol inference in transmission in the communication channel, the first feedback filter polynomial being a polynomial of a non-zero degree and the target polynomial being a polynomial of a non-zero degree, the target polynomial being a divisor of the first feedback filter polynomial, the degree of the target polynomial being different from the degree of the first feedback filter polynomial.

16. The apparatus of claim 15, wherein the feedback filter has filter coefficients selected from a quotient of the first feedback filter polynomial divided by the target polynomial that is a divisor of the first feedback filter polynomial has all of its roots inside unit circle.

17. The apparatus of claim 15, wherein the target polynomial has a root to maximize a signal-to-noise ratio at an output of a feed-forward filter at a receiver.

18. The apparatus of claim 15, wherein the first feedback filter polynomial is a Tomlinson-Harashima precode feedback filter polynomial.

19. The apparatus of claim 15, wherein the feedback filter is adapted to control intersymbol interference associated with transmission of information signals coupled to the mapping unit such that the target polynomial is a polynomial having a lowest non-zero degree as the divisor of the first feedback filter polynomial.

20. The apparatus of claim 15, wherein the apparatus further includes:
a matched filter to acquire a received signal from a channel, the received signal coupled to the channel from a remote precoder at a transmit end;
a whitening filter coupled to the matched filter;
a feed-forward filter coupled to the whitening filter; and
a receive mapping unit coupled to the feed-forward filter to provide symbol estimates of signal samples precoded in the remote precoder, the receive mapping unit and the mapping unit adapted to facilitate communication between two ends coupled to the channel.

21. A system comprising:
a mapping unit;
a feedback filter coupled to the mapping unit, the mapping unit and the feedback filter adapted as a precoder to provide a signal to a communication channel, the feedback filter structured to provide a controlled quantity of intersymbol inference in transmission in the communication channel, wherein the feedback filter has filter coefficients selected from a quotient of a first feedback filter polynomial modified by target polynomial, the first feedback filter polynomial selected with respect to completely compensating for intersymbol inference in transmission in the communication channel, the first feedback filter polynomial being a polynomial of a non-zero degree and the target polynomial being a polynomial of a non-zero degree, the target polynomial being a divisor of the first feedback filter polynomial, the degree of the target polynomial being different from the degree of the first feedback filter polynomial; and a network interface to couple the signal from the mapping unit to a wired network.

22. The system of claim 21, wherein the quotient has all of its roots inside unit circle.

23. The system of claim 21, wherein the target polynomial has a root to maximize a signal-to-noise ratio at an output of a feed-forward filter at a receiver.

24. The system of claim 21, wherein the first feedback filter polynomial is a Tomlinson-Harashima precoder feedback filter polynomial.

25. The system of claim 21, wherein the feedback filter is adapted to control intersymbol interference.

26. The system of claim 21, wherein the network interface includes a network interface card.

27. The system of claim 26, wherein the network interface card includes a 10GBase-T device.

28. The system of claim 21, wherein the system includes at least one of a computer, a switch, a router, or a server.

29. The system of claim 21, further including a bus to couple information signals to the mapping unit, the bus being compatible with PCI.

30. The system of claim 21, further including a bus to couple information signals to the mapping unit, the bus being compatible with PCI express.

31. A system comprising:
a mapping unit;
a feedback filter coupled to the mapping unit, the mapping unit and the feedback filter adapted as a precoder to provide a signal to a communication channel, the feedback filter structured to provide a controlled quantity of intersymbol inference in transmission in the communication channel, wherein the feedback filter has filter coefficients selected from a quotient of a first feedback filter polynomial modified by a target polynomial, the first feedback filter polynomial selected with respect to completely compensating for intersymbol inference in transmission in the communication channel, the first feedback filter polynomial being a polynomial of a non-zero degree and the target polynomial being a polynomial of a non-zero degree, the target polynomial being a divisor of the first feedback filter polynomial, the degree of the target polynomial being different from the degree of the first feedback filter polynomial; and a substantially omnidirectional antenna to transmit information processed through the mapping unit.

32. The system of claim 31, wherein the quotient has all of its roots inside unit circle.

33. The system of claim 31, wherein the target polynomial has a root to maximize a signal-to-noise ratio at an output of a feed-forward filter at a receiver.

34. The system of claim 31, wherein the first feedback filter polynomial is a Tomlinson-Harashima precoder feedback filter polynomial.

35. The system of claim 31, wherein the system further includes:
a matched filter to acquire a received signal from a wireless channel, the received signal coupled to the channel from a remote precoder at a transmit end;
a whitening filter coupled to the matched filter;
a feed-forward filter coupled to the whitening filter; and
a receive mapping unit coupled to the feed-forward filter to provide symbol estimates of signal samples precoded in the remote precoder, the receive mapping unit and the mapping unit adapted to facilitate communication between two ends coupled to the wireless channel.

* * * * *

UNITED STATES PATENT AND TRADEMARK OFFICE
CERTIFICATE OF CORRECTION

| | |
|---|---|
| PATENT NO. | : 7,986,744 B2 |
| APPLICATION NO. | : 11/794593 |
| DATED | : July 26, 2011 |
| INVENTOR(S) | : Andrey G. Efimov et al. |

It is certified that error appears in the above-identified patent and that said Letters Patent is hereby corrected as shown below:

In column 9, line 35, in Claim 9, delete "a" and insert -- A --, therefor.

Signed and Sealed this
Twenty-fourth Day of January, 2012

David J. Kappos
*Director of the United States Patent and Trademark Office*